US011106998B2

(12) United States Patent
Dai et al.

(10) Patent No.: US 11,106,998 B2
(45) Date of Patent: Aug. 31, 2021

(54) SYSTEM WITH HYBRID COMMUNICATION STRATEGY FOR LARGE-SCALE DISTRIBUTED DEEP LEARNING

(71) Applicant: Petuum inc, Pittsburgh, PA (US)

(72) Inventors: Wei Dai, Pittsburgh, PA (US); Hao Zhang, Pittsburgh, PA (US); Eric Xing, Pittsburgh, PA (US); Qirong Ho, Pittsburgh, PA (US)

(73) Assignee: PETUUM INC, Pittsburgh, PA (US)

( * ) Notice: Subject to any disclaimer, the term of this patent is extended or adjusted under 35 U.S.C. 154(b) by 950 days.

(21) Appl. No.: 15/814,394

(22) Filed: Nov. 16, 2017

(65) Prior Publication Data

US 2018/0330276 A1    Nov. 15, 2018
US 2019/0266515 A9    Aug. 29, 2019

Related U.S. Application Data

(60) Provisional application No. 62/504,473, filed on May 10, 2017.

(51) Int. Cl.
*G06N 3/04* (2006.01)
*G06N 20/00* (2019.01)
*H04L 12/24* (2006.01)
*H04L 29/08* (2006.01)

(52) U.S. Cl.
CPC ............ *G06N 20/00* (2019.01); *G06N 3/0454* (2013.01); *H04L 41/142* (2013.01); *H04L 67/10* (2013.01)

(58) Field of Classification Search
CPC ......... G06N 3/04; G06N 3/0454; H04L 67/10
See application file for complete search history.

(56) References Cited

U.S. PATENT DOCUMENTS

2018/0322387 A1* 11/2018 Sridharan .............. G06N 3/084

OTHER PUBLICATIONS

Lustig, D. (Feb. 23, 2013). Reducing GPU offload latency via fine-grained CPU-GPU synchronization. ACM Digital Library. https://dl.acm.org/doi/10.1109/HPCA.2013.6522332 (Year: 2013).*
Dean, J. (Dec. 3, 2012). Large scale distributed deep networks. ACM Digital Library, https://dl.acm.org/doi/10.5555/2999134.2999271 (Year: 2012).*
Cui, H. (Apr. 18, 2016). GeePS | Proceedings of the eleventh European conference on computer systems. ACM Digital Library. https://dl.acm.org/doi/10.1145/2901318.2901323 (Year: 2016).*

(Continued)

*Primary Examiner* — Hal Schnee

(57) ABSTRACT

A computer in a distributed computing system is disclosed. The computer includes: a graphics processing unit (GPU) memory; a central processing unit (CPU) memory comprising a Key-Value Store (KVS) module; an execution engine module configured to run a deep learning (DL) program to create a plurality of operator graph layers in the graphics processing unit memory; a client library module configured to create a GPU-CPU synchronization (GCS) module for each of the plurality of operator graph layers; a coordination service module configured to compute network cost of a first and a second communication scheme and select, based on the network cost, one of the first and second communication scheme for transmitting data associated with one of the plurality of operator graph layers from a corresponding GCS module.

16 Claims, 3 Drawing Sheets

(56) References Cited

OTHER PUBLICATIONS

Heller, M. (Dec. 14, 2016). MXNet review: Amazon's scalable deep learning. InfoWorld. https://www.infoworld.com/article/3149598/mxnet-review-amazons-scalable-deep-learning.html (Year: 2016).*

Colah. (Aug. 31, 2015). Calculus on computational graphs: Backpropagation. colah's blog, https://colah.github.io/posts/2015-08-Backprop/ (Year: 2015).*

Hadjis, S. (Jun. 14, 2016). Omnivore: An optimizer for multi-device deep learning on CPUs and GPUs. arXiv.org. https://arxiv.org/abs/1606.04487v1 (Year: 2016).*

Chen, T. (Dec. 3, 2015). MXNet: A flexible and efficient machine learning library for heterogeneous distributed systems. arXiv.org. https://arxiv.org/abs/1512.01274 (Year: 2015).*

* cited by examiner

SYSTEM WITH HYBRID COMMUNICATION STRATEGY FOR LARGE-SCALE DISTRIBUTED DEEP LEARNING

FIELD OF THE INVENTION

The present invention generally relates to distributed computing systems, and more particularly, is directed to a method and system of facilitating communications between multiple computers when executing a large-scale program such as a deep learning (DL) program that requires a huge amount of computational power to run efficiently.

BACKGROUND

A distributed computing system (or "distributed system") is a model in which components located on networked computers communicate and coordinate their actions by passing messages. Distributed systems are widely used to run programs that require a large amount of computational power to execute. Such programs can be referred to as "distributed programs" hereinafter. One type of such programs is machine learning (ML) programs. Machine learning (ML) allows computers to learn to perform certain tasks without being explicitly programmed. One type of advanced ML is deep learning (DL), which is based on learning data representations. DL has been used for performing a wide spectrum of tasks, including speech recognition, visual recognition, and language understanding. Typically, DL systems exhibit a high degree of model complexity, with many parameters in deeply layered structures that usually require a large amount of computing resources to train in their machine learning models. This training process involves processing a huge amount of data on different types of hardware such as graphics processing units (GPUs). The high computational cost of DL programs on large-scale data makes these programs ideal to be executed in a distributed fashion (by using multiple computers, each with their own GPUs and in communication with each other over a network) to be efficient.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a computer in a distributed computing system including a graphics processing unit (GPU) memory; a central processing unit (CPU) memory comprising a Key-Value Store (KVS) module; an execution engine module configured to run a deep learning (DL) program to create a plurality of operator graph layers in the graphics processing unit memory; a client library module configured to create a GPU-CPU synchronization (GCS) module for each of the plurality of operator graph layers; a coordination service module configured to compute network cost of a first and a second communication scheme and select, based on the network cost, one of the first and second communication scheme for transmitting data associated with one of the plurality of operator graph layers from a corresponding GCS module; and wherein the client library module is further configured to initiate a data transfer from the GCS module using the selected communication scheme.

Another embodiment is directed to A method of running a DL program including the steps of: parsing DL program code; constructing a plurality of operator graph layers in a GPU memory; creating a GCS module for each of the operator graph layers; activating a KVS module in a CPU memory; computing the network cost of a first and a second communication schemes for transmitting data; for each GCS module, selecting one of the communication schemes based on the network cost; and transmitting data from each GCS module using the selected communication scheme; wherein at least one GCS module uses the first communication scheme and at least one GCS module uses the second communication scheme.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
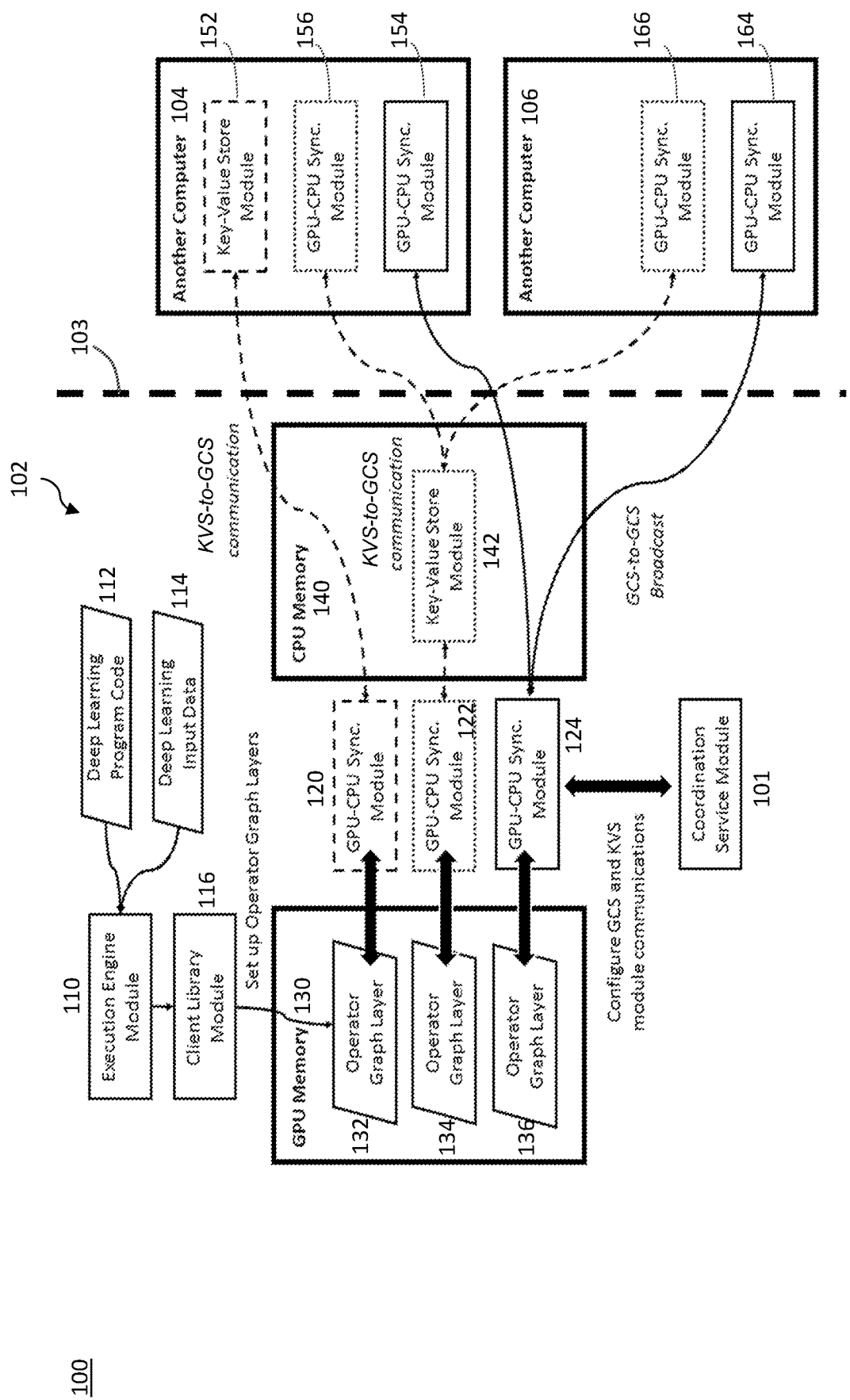
FIG. 1 is a block diagram illustrating the exemplary components of multiple computers on a distributed computer system, according to embodiments of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Current systems for executing DL programs either do not support distributed execution across multiple computers, or even when they do, offer poor performance due to the cost of model parameter update synchronization between the multiple computers in the distributed system (or on the distributed network). In particular, the high computational throughput of GPUs that are now commonly used to run DL programs allows more data to be processed per minute, leading to a greater need to synchronize information across all the computers on the network. This need grows with every new computer added to the distributed network. In the worst-case scenario, the DL program is executed with no improvement or even decrease in speed despite having more computers in the distributed system. Thus, a solution is needed to improve synchronization among the computers of a distributed system.

Described herein is a system with a hybrid communication strategy for synchronizing information across multiple computers when executing a resource-intensive program such as a DL program. In one embodiment, the inventive system provides (1) a DL execution engine that executes the DL program code on distributed computing devices and, while executing the DL program code, computes model parameter updates that are applied to the mathematical model of DL program, and (2) a coordination service module that relies on a hybrid communication strategy to exchange model parameter updates between any two computers in the distributed system. The hybrid communication strategy provides at least two distinct communication strategies for transmitting program data between computers during the execution of the DL program. Typically, the more efficient communication strategy can be selected based, for example, on the number of computers in the distributed system, the matrix dimensions associated with a particular pair of operator graph layer. Different communication strategies can be selected for synchronizing data associated with different pairs of operator graph layers. Specific embodiments of the distributed system and the hybrid communication strategy for a DL program are discussed in detail below with reference to FIGS. 1-3.

FIG. 1 illustrates multiple computers 102, 104, 106 in a distributed computing system 100 and the exemplary components of these computers. Specifically, as shown, the distributed computing system 100 can be a distributed DL system. It should, however, be understood that a similar system architecture can be utilized to run other type of programs that require large amount of computing resources across multiple computers.

As illustrated in FIG. 1, the left side of the dotted line 103 shows the exemplary components of a first computer 102 in the distributed DL system 100. A second and third computers 104, 106 are shown on the right side of the dotted line 103. The illustration of the second and third computers 104, 106 is simplified to show only these components/modules that are discussed below with respect to the operations of the disclosed system. It should be understood that the second and third computers 104, 106 can include the same components/modules as the first computer 102. Many of these components/modules are omitted in FIG. 1 for clarity purpose. In some embodiments, all computers in the distributed system can be identical.

The first computer 102 can include an execution engine module 110 that can run programs such as a DL program 112 on input data 114 made available to the program. For example, the execution engine module 110 can parse the DL program code 112 into one or more mathematical operator graphs, which are data structure representations of the mathematical loss function described by the DL programs 112. Specifically, the execution engine module 110 can perform automatic differentiation of a loss function (represented as an operator graph) to produce a first derivative of the loss function (also represented as an operator graph). When executing the DL program 112 on each computer 102, 104, 106, the execution engine module 110 can read input data 114 one datum at a time, and populates the loss function and first derivative operator graphs with appropriate values derived from the current input datum. In one embodiment, this can be done according to the back propagation algorithm. This process is usually referred as "computing the operator graphs". The final output of this computation can be a collection of evaluations and gradients (first derivatives) for each of the model parameters in the DL program with respect to the input datum.

The first computer 102 can also include two different types of memories: graphics processing unit (GPU) memory 130 and central processing unit (CPU) memory 140. The memories are for storing different types of data to be processed by the corresponding processing unit. The execution engine module 110 can communicate with both the GPU memory 130 and the CPU memory 140 through a client library module 116. The execution module 110 can allocate memory space from the CPU memory 140 and the GPU memory 130 on the computer 102. The GPU memory 130 can be used to store, for example, the loss function operator graph and the first derivative operator graph representing mathematical loss functions described by the DL programs 112. As will be discussed below, the operator graphs can be replicated across every computer 102, 104, 106 in the distributed system 100. In this embodiment, the construction of the operator graphs layers can happen simultaneously across all the computers 102, 104, 106 in the distributed system 100 when the system starts the DL program. Because the DL program can specify multi-layered mathematical models, the two operator graphs can be represented as a stack of operator graph layers 132, 134, 136, where each layer contains both model parameters and intermediate values required by the DL program.

The client library module 116 can provide an interface between the execution engine module 100 and the other modules (e.g., GPU memory 130 and CPU memory 140) in the first computer 102. The client library module 116 can also create a GPU-CPU Synchronization (GCS) module 120, 122, 124 for each layer 132, 134, 136 in the operator graphs stored in the GPU memory 130. The GCS modules 120, 122, 124 can be replicated on every computer 102, 104, 106 of the distributed system 100. The GCS modules 120, 122, 124 can be used for transferring data between different memories on the same computer or between different computers in the distributed system, as will be detailed below.

After the client library module 116 creates the GCS modules 132, 134, 136, a Key-Value Store (KVS) module 142 can be activated in the CPU memory 140. The KVS module 142 can provide one channel of data synchronization across two computers in the distributed system 100 when one specific synchronization strategy is selected. In addition, the Key-Value Store (KVS) module 142 can provide a Distributed Shared Memory interface (not shown in FIG. 1) to access certain module layer parameters and intermediate values (as determined by the hybrid communication strategy of the coordination service module 101). The KVS module 142 can be spread over all computers 102, 104, 106 in the network, and each computer can be responsible for storing the parameters and intermediate values of some layers. When the GCS modules 120, 124 are connected to the KVS modules 152, 142, respectively, they can send updated parameters and intermediate values to the KVS modules 152, 142. Each KVS module 152, 142 can combine the updates, and send the combined result back to the GCS module 120, 124.

Each GCS 120, 122, 124 is connected to either the KVS module 142 or to its replica GCS modules 154, 164 on the other computers 104, 106.

The first computer 102 can further include a coordination service module 101. When the DL program is started, the coordination service module 101 can collect information about the operating environment including, for example, cluster information (such as the number of computers, number of GPUs per computer, and their network addresses), the configuration of the operator graphs (e.g., number of layers, type of layers, number of neurons per layer, connectivity pattern between layers, etc.). Using the collected information, the coordination service module 101 can set up a hybrid communication strategy for synchronizing data across computers. In one example, the hybrid communication strategy can include broadcasting data directly from GCS modules 124 on one computer 102 to the corresponding GCS modules on other computers 104, 106 (GCS-to-GCS broadcast) to synchronize some operator graph layers across computers 102, 104, 106 and, for others, channeling data through the KVS module 142 on the same computer 102 to the corresponding GCS modules 156, 166 on the other computers 104, 106 (KVS-to-GCS communication).

For each operator graph layer 132, 134, 136 and its corresponding GCS module 120, 122, 124, the coordination service module 101 can use a formula to calculate the network cost of each of the two transmission schemes: (A) transmitting the layer parameters and intermediate values of a GCS module 122 to the KVS module 142 and on to the GCS modules 156, 166 on the other computers 104, 106 (KVS-to-GCS), and (B) broadcasting the layer parameters and intermediate values of the GCS module 124 to all other replica GCS modules 154, 164 representing the same layer in the other computers 104, 106 (GCS-to-GCS broadcast). As an example, one formula to calculate the network cost for transmission scheme (A) can be as follows: assume P is the number of worker machines, M and N are the matrix dimensions (column and row, respectively) of the operator graph layer, and the communication cost can be estimated as the product of P, M, and N (i.e., PMN). On the other hand, to calculate the network cost for transmission scheme (B), the formula can be $P^2 B (M+N)$, where B is the batch size, which is the number of data samples (images, table rows, sentences, etc.) processed per network communication attempt. Typically, B is an integer that is at least 1.

The coordination service module 101 determines the less costly alternative, and in the case of A being the less costly alternative, the coordination service module 101 configures the GCS module 122 to communicate with the KVS module 142. In contrast, in the case of B being the less costly alternative, the coordination service module 101 configures the GCS module 124 to communicate via broadcast directly to all its replica CGS modules 154, 164.

In this embodiment, each GCS module can accept at least three commands: Send, Receive and Move. The Move command is used to synchronize the contents of the operator graphs between the CPU memory and GPU memory. The Send and Receive commands are to synchronize the contents of operator graphs across different computers, either through the KVS module or through direct communication with replica GCS modules on other computers.

The client library module 116 can include a distributed directory including the addresses (e.g., IP addresses) of other computers in the distributed system 101. The client library module 116 can set up network send and receive ports for the KVS module 142 and the GCS modules 120, 122, 124 for transferring and receiving data from the other modules. The client library module 116 can also manage communications between the CGS modules 124, 154, 164 on different computers 102, 104, 106 if GCS-to-GCS (transmission scheme B) is selected by the coordination service module 101. When the execution engine module 110 is processing an input datum with the DL program 112, the computation proceeds sequentially across the layers of the loss function operator graph, followed by the layers of the first derivative operator graph. As soon as the computation for a given layer is completed, the coordination service module 101 can trigger the associated CGS module 124 on the first computer 102 to begin communication with the corresponding CGS modules 154, 164 on computers 104, 106, respectively. This spreads out the communication load for a single input datum across time, thus preventing network communication bottlenecks that could slow down the running of the distributed DL program. Alternatively, if KVS-to-GCS (transmission scheme A) is determined by the coordination service module 101 to be the less costly synchronization strategy, the client library module 116 can facilitate data exchange through the KVS module 142 as soon as the computation for a given layer is completed.

Although FIG. 1 only illustrates a KVS module 152 and multiple GCS modules 154, 164 in the second and third computers 104, 106, it should be understood that each of the second and third computers 104, 106 can have similar components and modules as the first computer 101. For example, each of the computers 104, 106 can include an execution engine module capable of executing program code such as DL program code using input data such as DL input data. Each computer 104, 106 can also include a client library module and a coordination service module similar to those found in computer 102. Each computer 104, 106 may include a GPU memory and a CPU memory. The GPU memory may include one or more operator graph layers and the CPU memory can include the KVS module 152. The coordination service module in each computer 104, 106 can configure the GCS and KVS modules communications on the respective computer 104, 106. Essentially, computers 104, 106 can mirror computer 102 not only in their internal module structures, but also in how their modules operate and communicate with the other computers on the distributed network.

Figure 2:
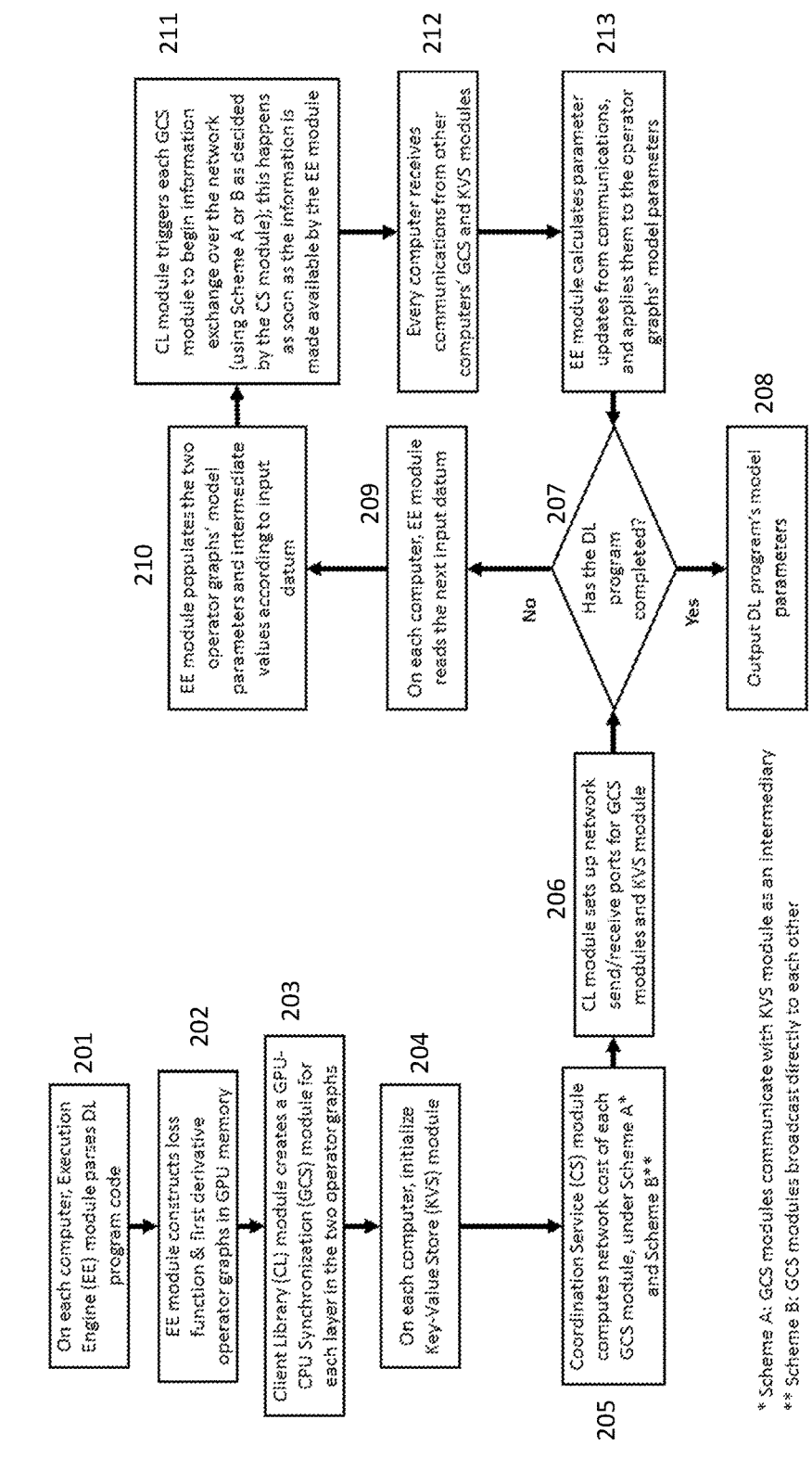
FIG. 2 is a flow chart illustrating the exemplary steps in the process of running a DL program on the distributed computer system of FIG. 1, according to embodiments of the invention.

FIG. 2 illustrates the exemplary steps in running a DL program over a distributed system such as the system 100 of FIG. 1 including multiple computers. It should be understood that the process of running the program may include other steps not shown in the flow chart of FIG. 2. Prior to starting the DL program on the distributed system, the DL program code is loaded onto each computer. In response to a command to start the DL program, the execution engine module on each computer parses the DL program code (step 201). Then, the execution engine modules can construct loss function and first derivative operator graphs to be stored in the GPU memories of their respective computers (step 202).

The operator graphs can be stored in the GPU memories as operator graph layers, as discussed above with reference to FIG. 1. The client library module on each computer then creates a GCS module for each layer in the operator graphs (step 203). Thereafter, the KVS module on each computer can be initialized (step 204).

The coordination service module on each computer can then compute the network cost of each GCS module under the two different communication schemes discussed above with reference to FIG. 1 (step 205). Specifically, one of the schemes has a GCS module on one computer communicate with a GCS module on a second computer by using a KVS module as an intermediary. The other scheme involves the GCS modules broadcasting directly to other GCS modules on other computers. The client library modules can then set up network communication (e.g., send/receive) ports for the GCS modules and the KVS modules to communicate with other computers on the distributed network (step 206).

A determination can then be made regarding whether the DL program has completed (step 207). If the DL program has completed, the program's model parameters is output (step 208). If the DL program has not completed, the execution engine module on each company can read the next input datum (step 209) and populate the two operator graphs' model parameters and intermediate values according to the input datum (step 210). The client library module then triggers each GCS module to begin information exchange over the network using one of the communication schemes as decided by the coordination service module (step 211). In one embodiment, this can take place as soon as the information to be communicated across the network is made available to the execution module. This information is then transmitted from either a GCS module or a KVS module on one computer to another computer over the distributed network via the selected communication scheme (step 212). The execution engine module on each computer can then calculate the parameter updates from the information received from other computers and apply them to its operator graphs' model parameters (step 213). Once the parameters are updated, the computer can check to see if the DL program has completed (step 207) and repeat the same steps 209-213 if the program is still running.

In other embodiments where the system is designed to run programs other than DL programs, the execution engine module 110 can execute other program code using other input data.

Figure 3:
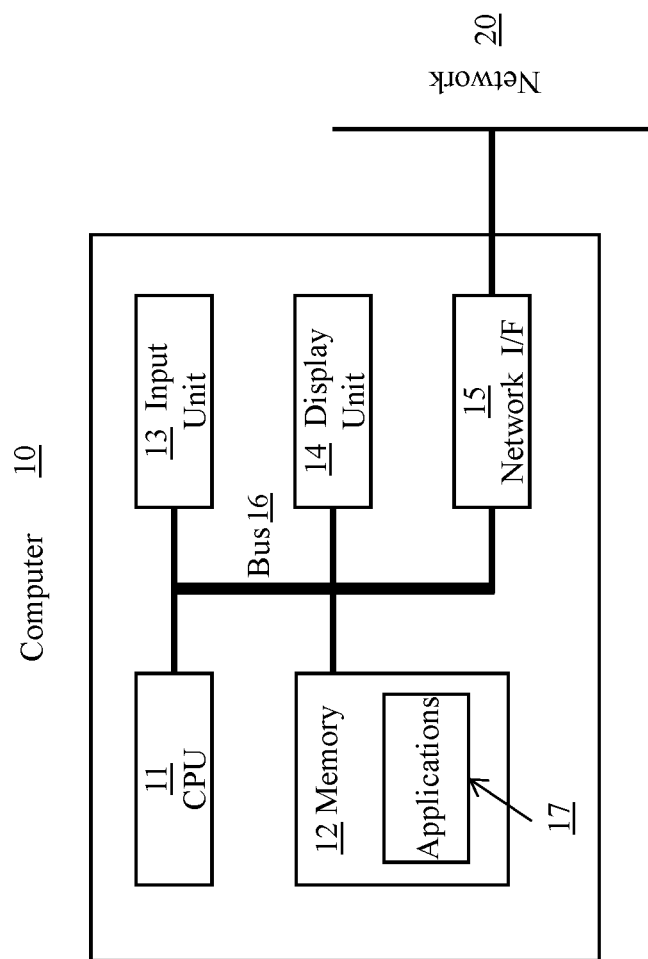
FIG. 3 is a block diagram illustrating an exemplary computer in which embodiments of the invention can be implemented.

FIG. 3 illustrates the exemplary components of a computer 10 which can be any of the computers 102, 104, 106 in the distributed DL system 100 of FIG. 1. The computer 10 can include a central processing unit (CPU) 11, memory 12 storing one or more applications 17, an input unit 13, a display unit 14, and a network interface 15, all connected to a bus 16. The network interface 15 allows the computer to connect to a network 20. In a computer such as the ones shown in FIG. 1, the one or more illustrated modules can be stored in memory 12. Memory 12 can include both a GPU memory and a CPU memory. The input unit 13 can receive use input or data. The network interface 15 allows computer to communicate with one or more of the other computers on the network. Such communication may employ one of the two schemes in the above-disclosed hybrid communication strategy.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A distributed computing system comprising a computer comprising: a graphics processing unit (GPU) memory; a central processing unit (CPU) memory comprising a Key-Value Store (KVS) module; an execution engine module configured to run a deep learning (DL) program to create a plurality of operator graph layers in the graphics processing unit memory; a client library module configured to create a GPU-CPU synchronization (GCS) module for each of the plurality of operator graph layers; a coordination service module configured to compute network cost of a first and a second communication scheme and select, based on the network cost, one of the first and second communication scheme for transmitting data associated with one of the plurality of operator graph layers from a corresponding GCS module; and wherein the client library module is further configured to initiate a data transfer from the GCS module using the selected communication scheme, wherein the first communication scheme comprises broadcasting data associated with the one of the plurality of operator graph layers from the corresponding GCS module to one or more GCS modules directly, wherein the network cost associated with the first communication scheme can be computed as $P^2B(M+N)$, wherein P is a number of computers in the distributed system, B is a batch size, M and N are dimensions of a matrix associated with the operator graph layer.

2. The system of claim 1, wherein the second communication scheme comprises using the KVS module as an intermediary to transmit data from one GCS to another GCS.

3. The system of claim 2, wherein the network cost associated with the second communication scheme can be computed as PMN, wherein P is a number of computers in the distributed system, M and N are dimensions of a matrix associated with the operator graph layer.

4. The system of claim 1, wherein the client library module is further configured to create send and receive ports for each of the plurality of GCS modules.

5. The system of claim 1, wherein the execution engine module running the DL program comprising populating two operator graphs' model parameters and intermediate values according to input datum.

6. The system of claim 5, wherein the execution engine module is configured to populate the model parameters and intermediate values according to back propagation algorithm.

7. The system of claim 1, wherein at least one of the GCS modules is in communication with the KVS module.

8. The system of claim 1, wherein at least one of the GCS modules is configured to receive data from another GCS module directly.

9. The system of claim 1, wherein at least one of the GCS modules is configured to receive data from a KVS module.

10. A method of running a Deep Learning (DL) program comprising: parsing DL program code; constructing a plurality of operator graph layers in a GPU memory; creating a GCS module for each of the operator graph layers; activating a KVS module in a CPU memory; computing the network cost of a first and a second communication schemes for transmitting data; for each GCS module, selecting one of the communication schemes based on the network cost; and transmitting data from each GCS module using the selected communication scheme; wherein at least one GCS module uses the first communication scheme and at least one GCS module uses the second communication scheme, where transmitting data using the first communication scheme comprises broadcasting data associated with the one of the plurality of operator graph layers from the corresponding GCS module to one or more other GCS modules directly, wherein the network cost associated with the first communication scheme is computed as $P^2B(M+N)$, wherein P is a number of computers in the distributed system, B is a batch size, M and N are dimensions of a matrix associated with the operator graph layer.

11. The method of claim 10, wherein transmitting data using the second communication scheme comprises using the KVS module as an intermediary to transmit data from one GCS to another GCS.

12. The method of claim 11, wherein the network cost associated with the second communication scheme is computed as PMN, wherein P is a number of computers in the distributed system, M and N are dimensions of a matrix associated with the operator graph layer.

13. The method of claim 10, further comprising creating send and receive ports for each of the plurality of GCS modules.

14. The method of claim 10, wherein parsing the DL code comprises populating two operator graphs' model parameters and intermediate values according to input datum.

15. The method of claim 10, further comprising at least one of the GCS modules receiving data from another GCS module directly.

16. The method of claim 10, further comprising at least one of the GCS modules receiving data from a KVS module.

\* \* \* \* \*